Aug. 2, 1949.　　　M. L. DEVOL　　　2,478,090
METHOD OF MAKING PLATE GLASS
Filed Jan. 2, 1943　　　　　　　　　　　　　　4 Sheets-Sheet 1

INVENTOR
Manson L. Devol

BY Olen E. Bee
ATTORNEY.

Aug. 2, 1949.    M. L. DEVOL    2,478,090
METHOD OF MAKING PLATE GLASS
Filed Jan. 2, 1943    4 Sheets-Sheet 2

INVENTOR
Manson L. Devol

BY Olen E. Bee
ATTORNEY.

Aug. 2, 1949.   M. L. DEVOL   2,478,090
METHOD OF MAKING PLATE GLASS
Filed Jan. 2, 1943   4 Sheets—Sheet 3

INVENTOR
Manson L. Devol
BY Olen E. Bee
ATTORNEY.

Aug. 2, 1949.  M. L. DEVOL  2,478,090
METHOD OF MAKING PLATE GLASS
Filed Jan. 2, 1943  4 Sheets-Sheet 4
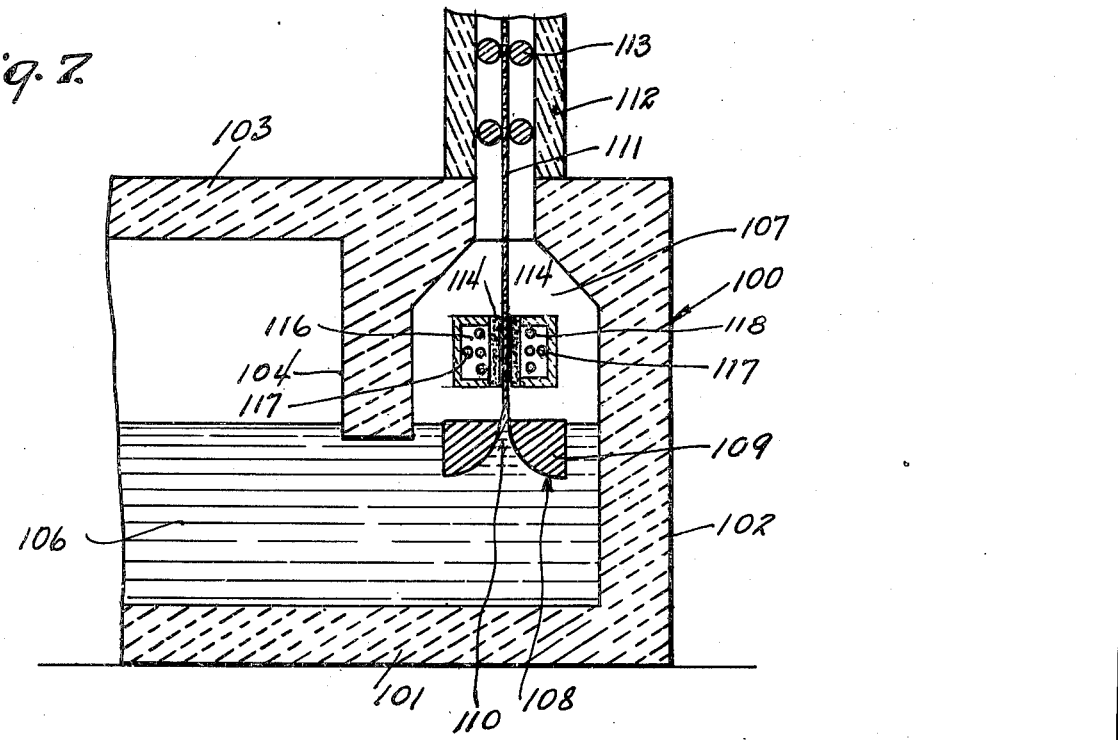
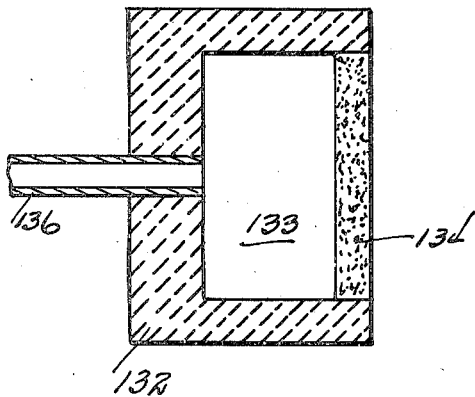
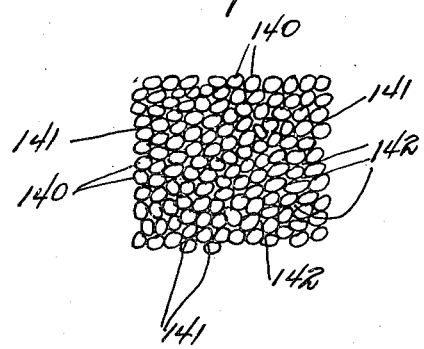
INVENTOR
Manson L. Devol
BY Olen E. Bee
ATTORNEY.

Patented Aug. 2, 1949

2,478,090

UNITED STATES PATENT OFFICE 2,478,090

METHOD OF MAKING PLATE GLASS

Manson L. Devol, Wilkinsburg, Pa., assignor to Pittsburgh Plate Glass Company, Allegheny County, Pa., a corporation of Pennsylvania Application January 2, 1943, Serial No. 471,121

2 Claims. (Cl. 49—3)

The present invention relates to processes of and apparatus for obtaining more efficient flow of fluid or plastic glasses over the surface of apparatus employed in manufacturing operations.

One object of the invention is to reduce friction between flowing but relatively viscous or plastic glass and the various surfaces of apparatus with which it may contact.

A second object is to prevent adhesion of the glass to the surface and to prevent corrosion of the surface by the hot glass.

A third object is to reduce heat losses from glass through the walls of the apparatus employed in handling or treating it.

A fourth object is to prevent devitrification of the glass at the line of contact between it and the apparatus.

A fifth object is to reduce so-called "ream" occurring in glass as a result of variations in the treatment of different portions of it.

These and other objects of the invention will be apparent from consideration of the following specification and the appended claims.

In the manufacture of various articles, such as sheet or plate glass by drawing or rolling processes, it is frequently desirable to flow the relatively viscous or even plastic glass mass over a refractory surface. Often difficulties are encountered in such operation. For example, the friction between the molten glass and the surface is relatively great, thus causing variations in movement and distortions of the glass which appear as ream in the finished product. Also, losses of the heat from the glass through the surfaces with which it contacts is comparatively great and may result in premature cooling. In some instances the condition of operation may even be such that a certain degree of so-called devitrification of the glass, i. e., segregation of the components, may occur.

Difficulties, for example, have been encountered in glass drawing operations in which a sheet of glass is fed from a tank or container over a discharge apron to a set of forming rolls. Under such conditions friction may cause variation in the path of travel of different portions of glass which produce irregularity in the refractive index of different portions of the same sheet. Devitrification of the glass along the lines of contact with the walls of the apron or spout likewise is likely to occur.

In accordance with the provisions of the present invention it is proposed to obviate or reduce the foregoing difficulties in various operations in which molten or plastic glass is caused to flow over the surfaces of handling apparatus. This is accomplished by forming the contacting surfaces or at least the essential portions of the contacting surfaces of a porous or permeable but refractory material and then gently blowing air or other gas through it in such manner as to provide a thin cushioning film of air upon the surface. No substantial amount of air is blown perpendicularly away as a blast or stream, but only in such amount as is required to replenish any portion of the gaseous medium moving parallel to the surface is supplied.

For a better understanding of the invention reference may now be had to the accompanying drawings in which like numerals refer to like parts throughout and in which—

Fig. 7 illustrates the application of the invention for purposes of maintaining the smoothness and uniformity of the sheet of glass in a vertical drawing chamber;

Fig. 9 is a sectional view through a block suitable for use in the embodiment of the invention shown in Fig. 8;

Fig. 10 is a sectional view showing the arrangement of the particles in a permeable member for use in practicing the invention.

Figure 1:
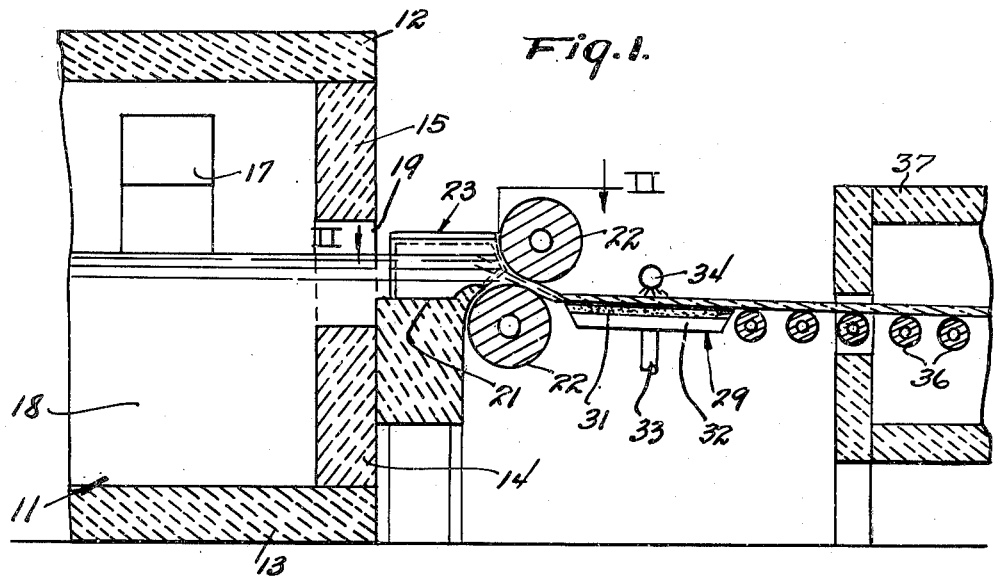
Fig. 1 is a sectional view which diagrammatically illustrates the application of the principles of the invention to provide an improved pouring apron or spout for a glass drawing apparatus.

The construction shown in Fig. 1 embodies a horizontally disposed glass tank 11 having a roof 12, bottom 13 and end wall sections 14 and 15, all formed of a refractory material of the type ordinarily employed in the construction of such tank. Gas and air in an inflammable mixture for heating the tank may be introduced through a plurality of ports, such as the port 17. This tank is fed in conventional manner with a mixture of glass batch materials which is melted down in the tank and flows forwardly therethrough in a pool 18.

Figure 2:
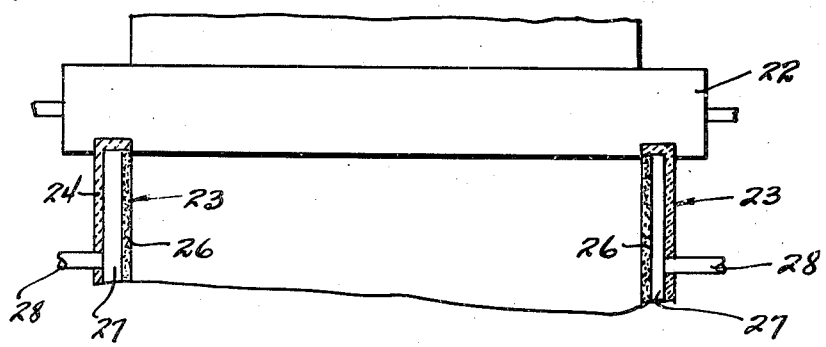
Fig. 2 is a fragmentary sectional view taken substantially upon the line II—II of Fig. 1.

The molten glass discharges from the tank through a slot 19 between the sections 14 and 15 and in so doing passes over an apron 21, leading to a pair of forming rolls 22, designed to size the sheet to desired thickness. The molten glass is guided and directed to the bight of the rollers in a stream of desired width by means of so-called "guns" 23, which comprise hollow plates best illustrated in Fig. 2. Each of these includes a recessed backing member 24 having a porous plate 26 disposed to close the recess 27, thus providing in effect an air chamber or box, which is supplied with a gaseous medium, such as air or nitrogen through conduits 28 leading to a suitable source of supply (not shown).

Plates 26 may be formed of cohered, but relatively finely powdered, highly refractory material, such as a plate of sintered, powdered, stainless steel, graphite or a plate of sintered silicon carbide or other material which will permit the permeation of gases through minute tortuous channels, but will still afford substantial resistance to the flow so that under low pressures a surface film of the order of $\frac{1}{32}$ of an inch in thickness will be formed. A pressure for example of the order of one pound per sq. inch in the space 27 will, under most conditions, be found to be satisfactory. The gaseous medium then flows very gently through the plate and provides the requisite cushioning film without actually inducing perceptible streams or blasts to blow perpendicularly from the surface in such manner as actively to push the glass away. The cushioning film, even under these conditions, will prevent contact between the glass and the porous plate surface, thereby reducing or substantially eliminating friction upon the glass. The cushioning layer of air or other gas, further, acts as an insulating medium to prevent the transfer of heat from the glass to the walls contiguous thereto. The fluidity of the glass is thus maintained and the apparatus is protected from excessive temperatures. The glass flows from the apron to the bight of the forming rolls 22 where it is shaped or rolled to a thin sheet of desired thickness.

The formed sheet passes to a second apron 29, which may also include a porous platetop 31 covering a chamber 32, supplied with gaseous medium by means of conduit 33. The sheet passes over the surface substantially without friction, thus preventing scarring or marring and also preventing other distortions. The sheet may be cooled during this period by a blast of air supplied by the conduit 34. When the sheet has become sufficiently cooled to be further moved without distortion or marring it passes to a conveyor system including rollers 36, that convey it away to an annealing lehr 37 of conventional design.

Figure 3:
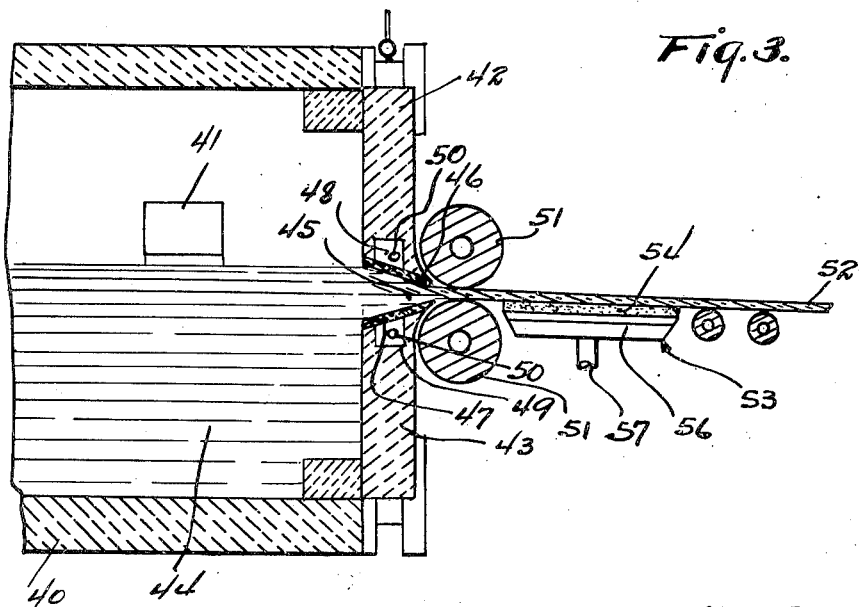
Fig. 3 is a fragmentary sectional view illustrating the application of the principles of the invention to a drawing slot in the side of a conventional glass tank.

In the apparatus shown in Fig. 3 a tank 40 is provided and is heated with combustible gases introduced through port 41. The upper and lower sections 42 and 43 of the end wall of this tank are so spaced as to provide a slot or nozzle 45 through which the glass from pool 44 within the tank flows as a continouus stream. In order to obtain frictionless flow through the nozzle or slot, the faces of the latter are formed as porous plates 46 and 47 and chambers 48 and 49 are formed in the members 42 and 43 back of the plates. These chambers are supplied with gas through conduits 50, so that a cushioning layer of air or gas is maintained upon the surfaces of the porous plates.

Molten glass flowing between forming rollers 51 is sized to form a sheet 52 and may then be fed forwardly to apron 53, including a porous plate 54 upon a wind chamber or box 56. Gaseous medium is supplied to this chamber by means of conduit 57, in order to provide the desired cushioning layer for the glass upon the plate. The sheet of glass moves over the surface almost without friction and without substantial disturbance from any blasts of air and can be transferred after it is sufficiently cooled to a suitable conveyor system for conduction through an annealing lehr.

Figure 4:
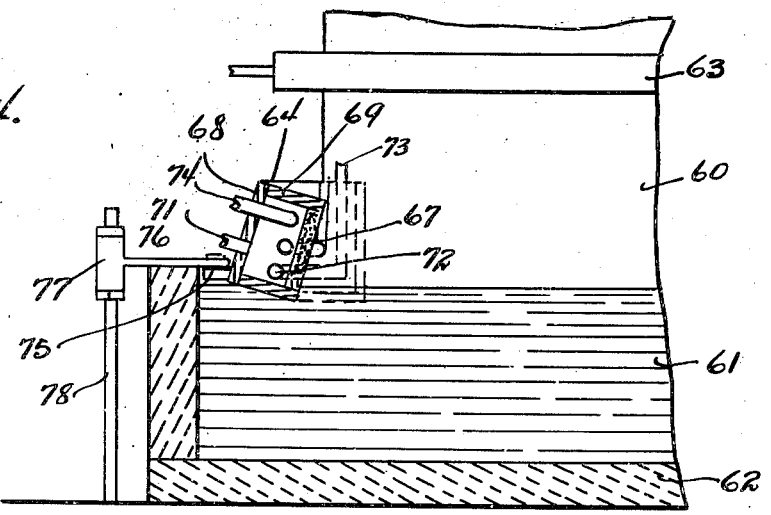
Fig. 4 is a fragmentary sectional view illustrating the application of the invention to a fork or edge bowl used in the vertical drawing of glass sheets.
Figure 5:
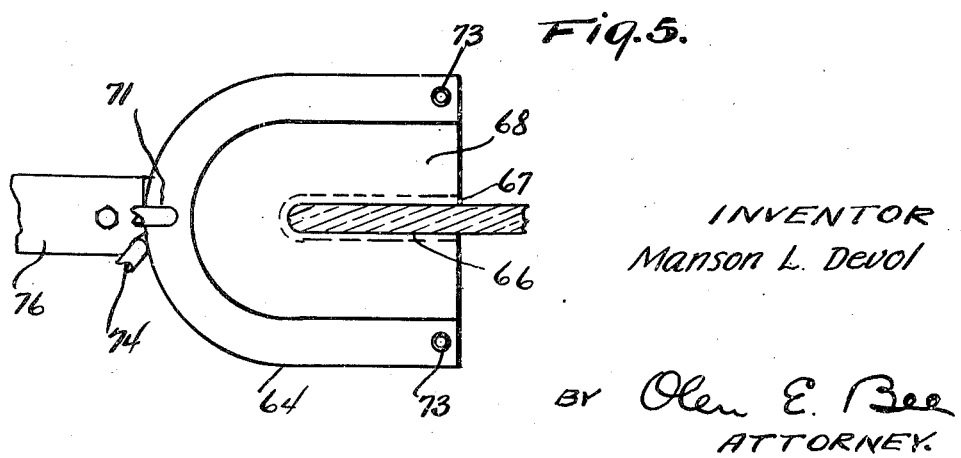
Fig. 5 is a fragmentary elevational view showing the edge bowl of Fig. 4 upon a larger scale.

In the apparatus shown in Fig. 4 a sheet of glass 60 is vertically drawn from a molten bath 61 in a suitable tank or container 62. The traction for the drawing operation may conveniently be supplied by a system of rollers 63 driven by any mechanism (not shown). The glass is maintained to width during the drawing operation by means of an edge bowl or forked construction 64 having as shown in Fig. 5 a substantial U-shape in which a slot 66 closely fits the surface of the sheet of glass being drawn. The inner faces 67 of the slot are formed of porous refractory material and a chamber 68 is provided back of the plate by means of non-permeable walls 69. The chamber is supplied with gaseous medium by means of conduit 71. It may also be provided with cooling coils 72, which are supplied with cooling medium, by means of a conduit 73 leading to a suitable source (not shown). Spent medium is drawn off by conduit 74. The fork or bowl 64 is supported by means of a lug 75 upon the wall 69, which lug is attached to an arm 76 extending horizontally and being attached at its outer extremity to a collar 77 upon a vertical standard 78.

In the operation of this embodiment of the apparatus the glass sheet is drawn upwardly between rollers 63 and simultaneously gas is supplied to the chamber back of the porous plate 67. The gas in permeating through the plate forms a cushion film between the plate and the surface of the glass approximately at the meniscus. The hardening of the edges of the sheet can be promoted by flowing cooling medium through the conduits 73 to the coil 72.

Figure 6:
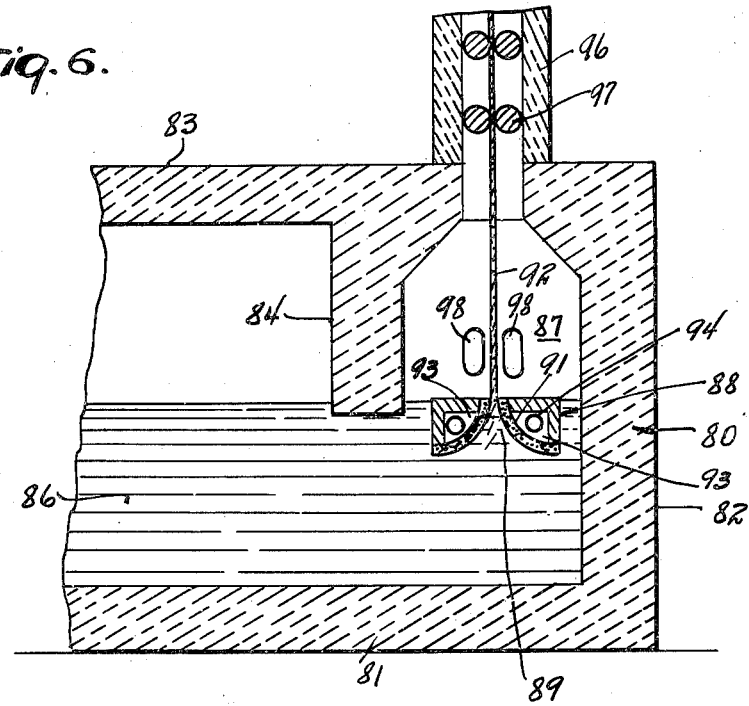
Fig. 6 is a fragmentary sectional view illustrating the application of the invention to the drawbar employed in the vertical drawing of sheet glass.

The application of the invention to a draw-bar construction suitable for the formation of sheet glass by continuous drawing operation is illustrated in Fig. 6. This construction includes a tank 80 of conventional design and having a bottom 81, end walls 82 and a roof or arch 83. A partition 84 projects downwardly from the roof and the lower edge thereof is submerged in the upper layers of a pool 86 of molten glass, whereby to define a drawing compartment 87. The draw-bar structure 88 to which the present invention is particularly directed floats in the molten glass in the compartment 87. It is formed with a slot 89 through which the glass is drawn. The faces of the slot are provided with permeable plates 91 of refractory material so curved as to promote the formation of a uniform sheet 92 of glass. Cells or chambers 93 are formed back of the plates 91 and are supplied with an inert gaseous medium by means of inlets 94.

The sheet of glass from the chamber is drawn upwardly through an annealing lehr 96 having drawing rollers 97 arranged in opposed pairs therein. These rollers are driven by any convenient means (not shown) and function to grip and pull the freshly formed sheet upwardly. In order to promote the solidification of the sheet as soon as possible after formation, coolers 98 are disposed in chamber 87 upon opposite sides of the sheet and at a point only slightly above the draw-bar. These coolers are supplied with a cooling medium, such as water introduced through suitable conduits (not shown).

In the operation of this embodiment of the invention molten glass is simply drawn from the portion of the pool within the compartment 87 through the slot 89. At the same time fluid under compression is supplied to the conduits 93. The medium permeates through the plates 91 and forms a thin film of almost completely quiescent gas upon the surface thereof. This film almost completely overcomes friction upon the glass passing through the slot of the draw-bar and also protects the surface of the bar from corrosion by the molten glass.

In Fig. 7 is disclosed glass drawing apparatus in which porous plates are provided in close proximity to the surface of the glass sheet while it is in its initial stages of cooling. In this way the glass while it is still soft and plastic is protected from the influence of atmospheric disturbances and air currents in the chamber. Uniform cooling over the entire width of the sheet is thus assured and a decrease in the waviness and other flaws in the glass is obtained. This construction includes a tank 100 having a bottom 101, side wall 102 and a roof 103. A barrier 104, depending from the roof, dips into the pool 106 of glass in such manner as to provide a drawing compartment 107. All of these elements are substantially similar to the corresponding elements shown in Fig. 6. The drawing compartment is provided with a draw-bar 108, which may be of the same construction shown in Fig. 6, or as actually shown in the drawings, is merely a simple member 109, having a drawing slot 110. The glass is drawn upwardly as a sheet 111 into a vertical annealing lehr 112 provided with drawing rollers 113.

Porous or permeable plates 114 of refractory material are disposed upon opposite sides of the sheet 111 in close proximity thereto. The spacing in effect may amount to a mere fraction of an inch, for example $\frac{1}{32}$ or even less. Chambers 116 are disposed back of the plates 114 and constitute wind boxes into which a gaseous medium, such as air or nitrogen is introduced through conduits 117. Cooling coils 118 are also provided in the chamber in close proximity to the plates 114 and may be supplied with a liquid coolant, such as water from a source (not shown). These coolers absorb heat from the plates and thus promote the rapid setting of the glass into a permanent non-devitrifiable sheet.

It is well recognized that molten glass in a tank, as it flows forward along the side walls, tends strongly to corrode the latter, thus necessitating replacement of the walls or the linings thereof and also tending in many instances to contaminate the glass. Sometimes the glass of the side walls is so retarded by friction that devitrification may occur.

Figure 8:
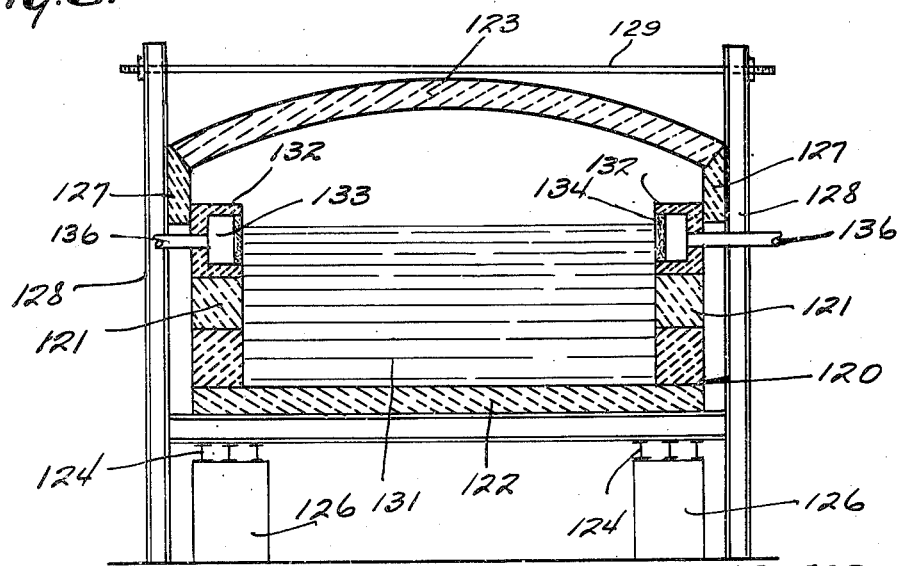
Fig. 8 is a fragmentary sectional view illustrating the application of the invention to a glass tank in such manner as to reduce or obviate corrosion of the side walls of the latter.

In accordance with the provisions of the present invention it is proposed to obviate or reduce the action of molten glass in a glass tank upon the side walls, especially at the lines of greatest activity, i. e., the surface, by the provision of hollow refractory blocks having facings of permeable material through which a gaseous medium can be forced, to provide a protective film of air. The apparatus as shown in Fig. 8 includes a tank 120 having side walls 121, a bottom 122 and a roof or arch 123. The bottom is supported upon I-beams 124, in turn resting upon pillars 126. The arch rests upon shoulder blocks 127, which are backed by vertical columns 128, having an interconnecting tie-rod 129.

The molten glass forms a pool 131 in the tank and in order to protect the side walls contiguous to the surface of the pool from the action of the molten glass, the upper courses 132 of blocks are provided with means for maintaining a film of air protecting their inner surfaces from the molten glass. In this construction the blocks are provided with recesses 133 closed by porous plates 134 of refractory material. The recesses are supplied with fluid under slight compression by conduits 136 leading to a source (not shown) of fluid, such as nitrogen or air under compression. It will of course be apparent that the entire side walls and even the bottom of the tank may be formed of blocks of the construction shown in Fig. 9. The films of quiescent air upon the surfaces of the blocks protect the blocks from corrosion by the glass. They also help to prevent friction between the glass and the side walls of the tank, thus insuring that all portions of the glass will move forward at a relatively uniform rate. Devitrification is thus prevented. It will also be apparent that the films of air act thermally to insulate the blocks of the tank from the molten glass so that heat losses are prevented and the blocks are protected from excessively high temperatures.

In Fig. 10 is illustrated a small section of a porous member such as might be employed in connection with any of the inventions herein illustrated and showing upon an enlarged scale an approximate arrangement of the particles constituting the member.

The member includes a large number of minute but refractory particles 140 of graphite, stainless steel or the like, bonded together at their points of contact 141 in any convenient manner. In some cases the particles may be sintered together. Small voids 142 are left between the particles and these voids intercommunicate to provide tortuous passages through which a gaseous medium can permeate, however, only with much frictional loss.

The forms of the invention herein shown and described are to be regarded merely as exemplary. It will be apparent to those skilled in the art that numerous modifications may be made therein without departure from the spirit of the invention or the scope of the appended claims.

What I claim is:

1. A method of forming a ribbon of glass substantially free of ream, which comprises flowing a stream of molten glass from a tank through a discharge opening in a wall thereof, passing the stream through a chute having side walls of porous permeable material having many tortuous channels adapted to transmit a gas with much frictional loss, and blowing gas through the side walls to maintain thin films of quiescent gas upon the surfaces thereof between the surfaces and the glass, without appreciable blast toward the glass and rolling out the glass into a ribbon of desired thickness as it comes from the chute.

2. In an apparatus for forming a glass sheet, a tank for supplying molten glass, said tank having a drawing opening formed in an end thereof, forming rollers spaced horizontally from the opening, a chute leading from the opening to the bight of the rollers, said chute having side walls comprising chambers, conduits communicating with the chambers for supplying gas under pressure thereto; porous closures for the chambers constituting contact elements for the glass flowing through the chute, said closure elements being formed of comminuted refractory material bonded together to provide intercommunicating spaces between the particles, said spaces constituting highly tortuous channels through which gas from the chamber gently flows to form quiescent films between the glass and the surfaces of the closure members.

MANSON L. DEVOL.

REFERENCES CITED

The following references are of record in the file of this patent:

UNITED STATES PATENTS

| Number | Name | Date |
|---|---|---|
| Re. 16,856 | Gelstharp | Jan. 17, 1928 |
| 820,205 | Keighley | May 8, 1906 |
| 958,613 | Forgo | May 17, 1910 |
| 1,128,448 | Hitchcock | Feb. 16, 1915 |
| 1,251,932 | Slingluff | Jan. 1, 1918 |
| 1,420,868 | Scohy | June 27, 1922 |
| 1,483,336 | Corl | Feb. 12, 1924 |
| 1,554,267 | Ewing | Sept. 22, 1925 |
| 1,591,179 | Myers | July 6, 1926 |
| 1,622,817 | Waldron | Mar. 29, 1927 |
| 1,827,138 | Brancart | Oct. 13, 1931 |
| 1,841,660 | Mambourg | Jan. 19, 1932 |
| 2,162,983 | Sullivan | June 20, 1939 |
| 2,243,194 | Cook | May 27, 1941 |
| 2,248,717 | Nash | July 8, 1941 |
| 2,272,930 | Black | Feb. 10, 1942 |
| 2,395,727 | Devol | Feb. 26, 1946 |

FOREIGN PATENTS

| Number | Country | Date |
|---|---|---|
| 9,033 | Great Britain | 1904 |
| 434,777 | France | Dec. 6, 1911 |

OTHER REFERENCES

Powder Metallurgy, Jones, pub. by Edward Arnold & Co., London, 1937, pp. 134 and 135. (Copy in Div. 3.)